United States Patent [19]

Thubeauville

[11] 4,205,047
[45] May 27, 1980

[54] TUBULAR APPARATUS FOR CONDUCTING GASES

[75] Inventor: Heinz Thubeauville, Bochum, Fed. Rep. of Germany

[73] Assignee: Dr. C. Otto & Comp. G.m.b.H., Bochum, Fed. Rep. of Germany

[21] Appl. No.: 875,059

[22] Filed: Feb. 6, 1978

[30] Foreign Application Priority Data

Feb. 12, 1977 [DE] Fed. Rep. of Germany ....... 2705981

[51] Int. Cl.$^2$ ............................ B01J 3/04; F27D 1/00
[52] U.S. Cl. ................................ 422/242; 432/251; 220/435
[58] Field of Search .................... 23/290, 289; 52/573; 165/81-83; 110/336; 220/435, 445, 85 B; 432/251; 422/242

[56] References Cited

U.S. PATENT DOCUMENTS

| 2,545,384 | 3/1951 | Rehrig | 220/445 X |
|---|---|---|---|
| 2,770,451 | 11/1956 | Almond | 432/251 |
| 3,528,647 | 9/1970 | Hyde | 432/251 |
| 3,735,011 | 5/1973 | Soy Kan | 432/251 |
| 3,767,896 | 10/1973 | Ryan | 165/83 X |
| 3,913,775 | 10/1975 | Ozaki | 220/435 X |
| 4,083,792 | 4/1978 | Bielski | 432/251 |

Primary Examiner—Joseph Scovronek
Assistant Examiner—Chris P. Konkol
Attorney, Agent, or Firm—Thomas H. Murray; Clifford A. Poff

[57] ABSTRACT

An inner cylindrical shell assembly includes a metal cylinder with the wall thereof divided along at least one but typically a plurality of longitudinal parting lines. A stress compensator tube extends along each parting line and is welded to the edge surfaces of the metal cylinder. An inner stratum of solid corundum bricks overlies an outer stratum of corundum bricks which has internal spherical hollows. These strata of bricks are retained under stress within the inner cylindrical shell assembly. This assembly is received within an outer cylindrical metal shell and annular members are disposed within an annular space between the shells with a felt mat disposed between the annular members and the inner cylindrical shell.

10 Claims, 4 Drawing Figures

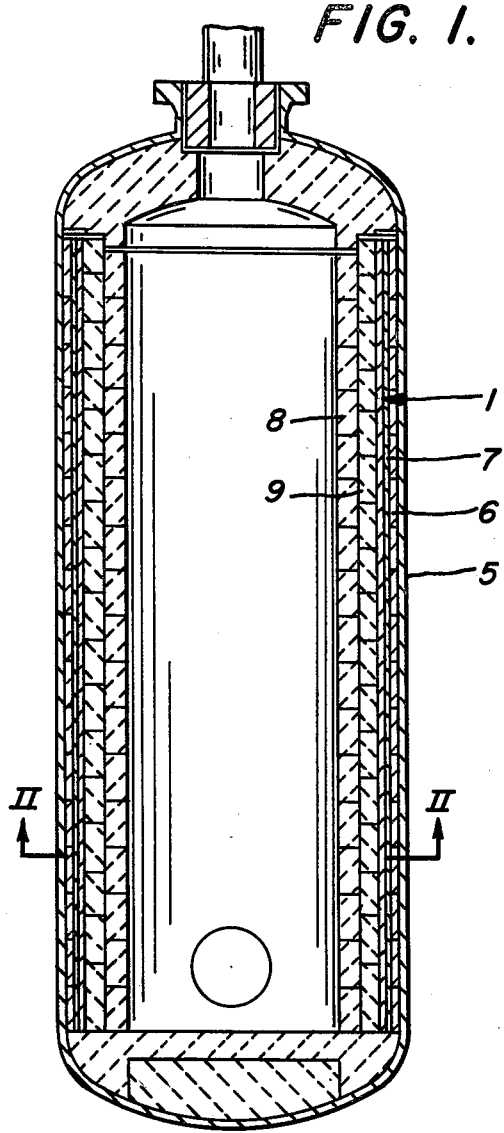
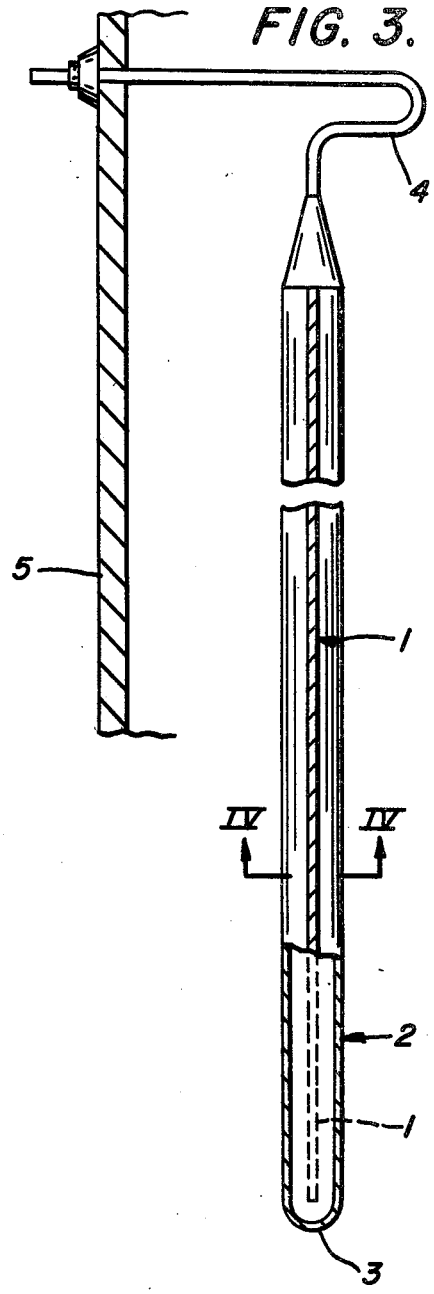
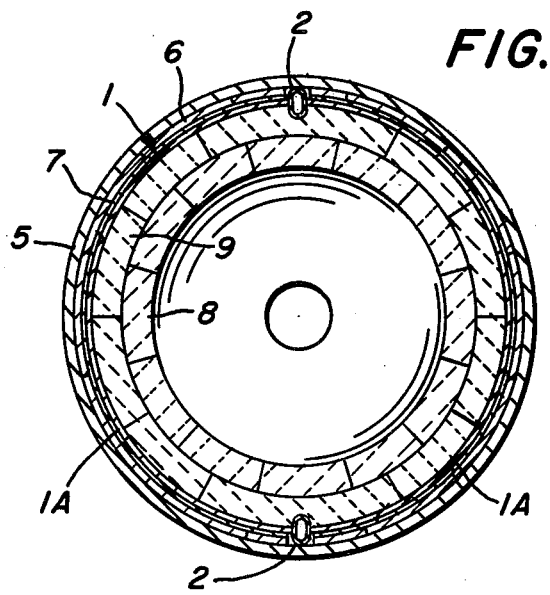
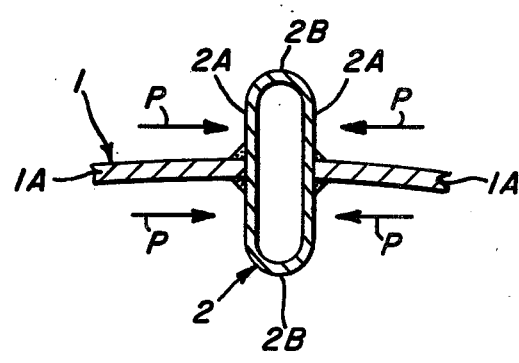

TUBULAR APPARATUS FOR CONDUCTING GASES

BACKGROUND OF THE INVENTION

This invention relates to an improved construction and relationship of parts to form a tubular apparatus for conducting gases under a high pressure and an elevated temperature, and more particularly to such an apparatus having a refractory lining surrounded by a metal shell.

Tubular apparatus of this type is designed for the conduction or performing reactions with gases in which the apparatus is designed for use with gases at a specific pressure and temperature. A change in either the temperature or the pressure of the gases creates disturbances resulting in the destruction of a brick lining as well as the metal shell forming a tubular apparatus. A reduction to the temperature below the intended temperature of the gases may cause the expansion and butt joints to be open. Moreover, the refractory bricks may crack. Leakage through the brickwork occurs and as a result, edge detachment and destruction of the lining and the outer metal shell of the tubular apparatus. In the event the temperature of the gases increases beyond the intended temperature, stresses occur in the brickwork and in the metal shell which exceed permissible stresses and this, in turn, produces damage to the tubular apparatus.

SUMMARY OF THE INVENTION

It is an object of the present invention to provide an improved construction for a tubular apparatus wherein a refractory lining is surrounded by a cylindrical metal shell such that temperature fluctuations will not produce leakages in the refractory lining and detrimentally affect the metal used to form an outer cylindrical shell of the tubular apparatus.

More specifically, according to the present invention, there is provided a tubular apparatus for conducting gases under a high pressure and at an elevated temperature, the apparatus including the combination of an outer cylindrical metal shell, an inner cylindrical shell assembly including an elongated metal cylinder having the wall thereof divided along at least one longitudinal parting line and a stress compensator member extending along the parting line between the parted wall edge surfaces in the elongated metal cylinder, and a lining of refractory material retained under stress within the inner cylindrical shell assembly.

Thus, in accordance with the present invention, an outer cylindrical metal shell surrounds an inner metal cylindrical shell employed to retain a refractory lining under stress by providing that the inner cylindrical metal shell is parted along at least one parting line such that a compensator strip is disposed along the parting line within the wall of the inner shell.

In a given set of conditions or circumstances, it is sufficient to provide a single compensator member or compensator strip between the edge surfaces along the parting line in the metal cylinder. However, it is within the scope of the present invention to provide that the metal cylinder is divided into two or more parts along longitudinal parting lines and compensator strips are provided between the wall portions and joined in a fixed manner to interconnect the divided parts of the metal cylinder.

In the preferred form of the present invention, the compensator strips take the form of tubes. The hollow space within the tubes is connected by a conduit to the atmosphere so that a constant pressure can be maintained within the tubes. The compensator tubes may be formed in a manner such that portions of the tube walls are situated at laterally-spaced locations from the wall of the metal sleeve while the tubes are joined by welding to the sleeve parts. In this way, the cross section of the tubes is elongated or flattened into a generally rectangular cross-sectional configuration to form side walls that are generally parallel and integral with rounded end walls. The walls of the tubes which are joined to the divided portions of the metal sleeves by welding may be formed, if desired, so that these walls converge toward the rounded ends. In other words, the compensator tube is flattened without forming in cross section, parallel opposed side walls.

The aforesaid compensator tube may be constructed from tubes to define, in cross section, an arcuate segment which does not entirely correspond to a closed ring whereby the divided parts of the metal sleeve are welded to the longitudinal terminal ends of the arcuate segment on the outside surface thereof such that the major portion of the tube segment projects toward the inside of the outer cylindrical metal shell. Because of the small inner surface area as compared with the outer surface area of the tube segment, the external pressure acting on the tube segment moves the terminal edges thereof together. The tube segment is subject to stress by its contact with the internal surface of the outer cylindrical metal shell. The refractory lining which is retained under stress by the inner cylindrical shell assembly is, if desired, divided into an inner stratum of solid corundum bricks and an outer stratum or corundum bricks which have internal spherical hollows. The bricks used to form the refractory lining preferably have ground surfaces to form smooth joints between abutting bricks. Such a refractory lining construction will expand and contract with pressure and temperature fluctuations within the internal chamber of the tubular apparatus of the tubular apparatus because the internal chamber, i.e., the space surrounded by the refractory brick, is defined by the refractory brick which is retained under stress by the inner cylindrical shell assembly. The shell assembly expands and contracts as to its diameter by virtue of the compensator strips or strips used to form the shell assembly.

In the preferred form of the present invention, the space between the outer cylindrical metal shell and the inner cylindrical shell assembly is filled with annular members placed one upon the other. Preferably, these annular members are made from a ceramic compound or metal. A resilient felt mat is inserted between the outer cylindrical metal shell and the annular members. The mat provides not only the desired resiliency but also a sealing function which prevents the flow of gasses through the edges of the internal cylindrical shell assembly.

These features and advantages of the present invention as well as others will be more fully understood when the following description is read in light of the accompanying drawings, in which:

FIG. 1 is an elevational view, in cross section, of the tubular apparatus embodying the features of the present invention;

FIG. 2 is an enlarged sectional view taken along line II—II of FIG. 1;

FIG. 3 is an enlarged partial view similar to FIG. 1 but illustrating the details of the compensator strip member forming part of the present invention; and FIG. 4 is a sectional view taken along line IV—IV of FIG. 3.

The parts used to form the tubular apparatus according to the present invention, as shown in FIG. 1, include an outer cylindrical metal shell 5 which is closed at the top and bottom portions thereof by walls of the shell. The tubular apparatus shown in FIG. 1 is used, for example, for conducting a hot gas under pressure which is fed by entry and delivery conduit lines coupled to the apparatus. An internal refractory lining 8 is formed of corundum bricks which are surrounded by a second part of the refractory lining formed of corundum bricks having internal spherical hollows. An inner cylindrical shell assembly 1 is coaxially arranged within the outer cylindrical metal shell 5 and extends along substantially the entire length thereof. The inner cylindrical shell assembly 1 includes an elongated metal cylinder which is divided along at least one longitudinal parting line. However, according to the embodiment shown in FIG. 2, the elongated metal cylinder is divided along diametrically opposed parting lines forming arcuate cylindrical segments 1A. Therefore, the elongated metal cylinder is comprised of two semicircular halves which are joined together through compensator strips 2 and interconnected by beads of weld as best shown in FIG. 4. It is within the scope of the present invention to divide the metal cylinder into a plurality of shorter arcuate segments and employ a compensator strip to join together each segment along the parting line by welding.

The compensator strips 2 in their preferred form have an elongated rectangular cross section with rounded ends. Parallel longitudinal walls 2A terminate into arcuate end walls 2B. The compensator strips are arranged so that the longitudinal walls 2A extend transversely to the edge surfaces of metal cylinder portions 1A which are welded thereto. As illustrated in FIG. 3, the compensator strip is connected by a tubular conduit 4 which extends through the outer cylindrical metal shell 5 so that the interior of the compensator strip is maintained at atmospheric pressure. An end cap 3 is secured onto the end of the compensator strip opposite the tubular conduit 4. If desired, the compensator strip shown in FIG. 4 may be constructed so that the longitudinal walls 2A pass through the gap between cylinder portions 1A and terminate whereby the compensator strip takes the form of a tube segment with a semicircular cross section. Such a tube segment has only one curved end 2B provided outwardly and into contact with the internal surface of the outer cylindrical metal shell 5.

The space between the outer cylindrical shell 5 and the inner cylindrical shell assembly 1 is substantially filled by annular members 6 placed one upon the other. A ceramic felt mat 7 is inserted between the annular members 6 and the inner cylindrical shell assembly 1. Preferably, the mat 7 consists of finely-spun basalt filaments. The felt mat provides a resilient element between the outer cylindrical metal shell 5 and the inner cylindrical shell assembly 1.

The inner cylindrical shell assembly 1 including the compensator strips 2 do not acquire an excessive temperature since the greater part of the thermal gradient between the gas flow space within the tubular apparatus and the ambient air is taken by the refractory lining comprised of the inner stratum 8 and outer stratum 9 of refractory brick. It is expected that the temperature of the inner cylindrical shell assembly 1 will rise to approximately 300° C. to 400° C. when the temperature of the gases within the gas flow space is of the order of 1000° C. Thus, one may select a steel of the most diverse kind to meet the requirements for providing the metal parts of the shell assembly 1.

The novel construction and relationship of parts employed to form the tubular apparatus of the present invention offer the advantage that the refractory lining thereof is maintained under a constant stress and, therefore, in a tightly sealed condition through the utilization of the elevated pressure provided by the gases flowing in the gas flow space within the tubular apparatus. This internal pressure provides a corresponding compression of the compensator strip. The stress from the metal cylinder of the inner cylindrical shell 1 is given, for example, to be 40 bar×100 centimeters×7 centimeters=28,000 kilograms where the compensator strip has a height of 100 centimeters and a width of 7 centimeters (calculated in the radial direction) and there is a given internal pressure of 40 bar. This force maintains the brickwork forming the refractory lining under stress and expansion of the brickwork is absorbed over all temperature ranges. Tight sealing of the brickwork is insured by providing that the internal pressure within the apparatus is sufficiently high. The mating surfaces of the corundum bricks are ground so as to form smooth joints between abutting bricks to assure sealing.

Although the invention has been shown in connection with a certain specific embodiment, it will be readily apparent to those skilled in the art that various changes in form and arrangement of parts may be made to suit requirements without departing from the spirit and scope of the invention.

I claim as my invention:

1. A tubular apparatus for conducting gases under a high pressure and at an elevated temperature, said tubular apparatus including the combination of:

a lining of refractory brick adapted to undergo stressing to form a gas-impervious seal while conducting gases under a high pressure and elevated temperature, an inner cylindrical shell assembly surrounding the outer surface of said lining of refractory brick, said inner cylindrical shell assembly including an elongated metal cylinder having the wall thereof divided along at least one longitudinal parting line and a stress compensator member extending along said parting line between the parted wall edge surfaces in the elongated metal cylinder to maintain said lining of refractory brick under stress by resisting forces imposed on the refractory brick due to the high pressure of the gases at an elevated temperature, an outer cylindrical metal shell to receive and support therein said inner cylindrical shell assembly and constrain the stress compensator member thereof, and conduit means to pass gases under a high pressure and elevated temperature along said lining of refractory brick.

2. The tubular apparatus according to claim 1 wherein said stress compensator member includes a tube.

3. The tubular apparatus according to claim 2 wherein said stress compensator member further includes conduit means coupled to said tube for extending to the atmosphere.

4. The tubular apparatus according to claim 1 wherein the wall of said metal cylinder is divided along longitudinal parting lines into a plurality of arcuate segments, and a stress compensator member extends along the parting line between each of the plurality of arcuate segments.

5. The tubular apparatus according to claim 4 wherein said stress compensator member includes a tube coupled to conduit means extending to the atmosphere.

6. The tubular apparatus according to claim 1 wherein said stress compensator member includes a tube joined by welds to the wall of said elongated metal cylinder.

7. The tubular apparatus according to claim 6 wherein the arcuate and wall portions of said tube are laterally displaced from the wall of said elongated metal cylinder.

8. The tubular apparatus according to claim 1 wherein said lining of refractory brick includes an inner stratum of solid corundum bricks overlying an outer stratum of corundum bricks which have internal spherical hollows.

9. The tubular apparatus according to claim 8 wherein the bricks forming said inner stratum and outer stratum have ground surfaces to form smooth joints between abutting bricks.

10. The tubular apparatus according to claim 1 further comprising superimposed annular members within an annular space between said outer cylindrical metal shell and said inner cylindrical shell assembly, and a felt mat disposed between said annular members and said inner cylindrical shell assembly.

* * * * *